United States Patent
Buckhout

(10) Patent No.: US 10,283,752 B2
(45) Date of Patent: May 7, 2019

(54) ELECTRIC VEHICLE BATTERY

(71) Applicant: Faraday & Future Inc., Gardena, CA (US)

(72) Inventor: Kameron Fraige Saad Buckhout, Inglewood, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 251 days.

(21) Appl. No.: 15/437,541

(22) Filed: Feb. 21, 2017

(65) Prior Publication Data

US 2017/0301904 A1    Oct. 19, 2017

Related U.S. Application Data

(62) Division of application No. 15/060,331, filed on Mar. 3, 2016, now Pat. No. 9,595,705.

(51) Int. Cl.
| | |
|---|---|
| *H01M 2/20* | (2006.01) |
| *H01M 10/42* | (2006.01) |
| *H01M 2/10* | (2006.01) |
| *H01M 2/12* | (2006.01) |
| *H01M 10/04* | (2006.01) |

(52) U.S. Cl.
CPC ......... *H01M 2/206* (2013.01); *H01M 2/1072* (2013.01); *H01M 2/1077* (2013.01); *H01M 2/1094* (2013.01); *H01M 2/12* (2013.01); *H01M 2/1223* (2013.01); *H01M 10/04* (2013.01); *H01M 10/425* (2013.01); *H01M 10/4257* (2013.01); *H01M 2/1258* (2013.01); *H01M 2010/4278* (2013.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 2015/0069829 | A1* | 3/2015 | Dulle | B60R 16/03 307/9.1 |
| 2016/0093862 | A1* | 3/2016 | DeKeuster | H01M 2/206 429/121 |

* cited by examiner

*Primary Examiner* — Wojciech Haske
(74) *Attorney, Agent, or Firm* — Knobbe Martens Olson & Bear LLP

(57) ABSTRACT

A battery for an electric vehicle is disclosed. The battery may be a low voltage battery for powering low voltage systems. The battery may include a housing formed from at least two parts. For example, the housing may include a top portion that is sealed to a bottom portion. A plurality of rechargeable electrochemical cells may be disposed within the bottom portion. A printed circuit board and/or a bus bar may be disposed within the top portion. The housing can includes a desiccant and/or a two-way pressure valve extending through a surface of the housing. The valve may be used to prevent moisture ingress into an interior of the housing and/or may allow a pressure inside of the housing to equilibrate to the external air pressure.

5 Claims, 8 Drawing Sheets

ELECTRIC VEHICLE BATTERY

CROSS-REFERENCE TO RELATED APPLICATIONS

The present application is a divisional application of U.S. patent application Ser. No. 15/060,331, filed Mar. 3, 2016, and titled "ELECTRIC VEHICLE BATTERY," and is related to U.S. patent application Ser. No. 15/060,381, filed Mar. 3, 2016, and titled "FLEXIBLE CIRCUIT FOR VEHICLE BATTERY," U.S. patent application Ser. No. 15/060,308, filed Mar. 3, 2016, and titled "VEHICLE BATTERY HEATING SYSTEM," and U.S. patent application Ser. No. 15/060,416, filed Mar. 3, 2016, and titled "BUS BAR AND PCB FOR VEHICLE BATTERY." Each of the above-referenced applications is hereby expressly incorporated by reference in its entirety and for all purposes.

BACKGROUND

Field

This disclosure relates to vehicle battery systems. More specifically, the present disclosure is directed to a low voltage battery for an electric vehicle.

Description of the Related Art

Electric vehicles, hybrid vehicles, and internal combustion engine vehicles generally contain a low voltage automotive battery to provide power for starting the vehicle and/or to provide power for various other electrically powered systems. Automotive batteries typically provide approximately 12 volts, and may range up to 16 volts. Such batteries are typically lead-acid batteries. In electric or hybrid vehicles, a low voltage automotive battery may be used in addition to higher voltage powertrain batteries.

SUMMARY

The systems and methods of this disclosure each have several innovative aspects, no single one of which is solely responsible for its desirable attributes. Without limiting the scope as expressed by the claims that follow, its more prominent features will now be discussed briefly.

A battery for an electric vehicle is disclosed. The battery may be a low voltage battery for powering low voltage systems. The battery may include a housing formed from at least two parts. For example, the housing may include a top portion that is sealed to a bottom portion. A plurality of rechargeable electrochemical cells may be disposed within the bottom portion. A printed circuit board and/or a bus bar may be disposed within the top portion. The housing can includes a desiccant and/or a two-way pressure valve extending through a surface of the housing. The valve may be used to prevent moisture ingress into an interior of the housing and/or may allow a pressure inside of the housing to equilibrate to the external air pressure.

In some implementations, a battery for an electric vehicle includes a housing. The housing may comprise a top portion sealed to a bottom portion. A plurality of rechargeable electrochemical cells may be disposed within the bottom portion. The electrochemical cells may have a top side and a bottom side. The top side of the cells may have at least one positive terminal and at least one negative terminal disposed thereon. A printed circuit board and/or a bus bar may be disposed within the top portion. In some aspects, the housing also includes a desiccant disposed within the housing. The housing may include a two-way pressure valve extending through a surface of the housing. The valve may be configured to prevent moisture ingress into an interior of the housing and/or configured to allow a pressure inside of the housing to equilibrate to an external air pressure.

In some implementations, a method of assembling a vehicle battery may include one or more of the following steps described further below. A plurality of rechargeable electrochemical cells may be placed into a first housing portion. The cells may be electrically connected with, for example, circuitry configured to transfer electric current to, from, and between the cells. At least one bus bar can be secured to a second housing portion that is different from the first housing portion. The at least one bus bar may be connected to at least one terminal extending through the second housing portion. At least one printed circuit board can be secured and/or connected to the at least one bus bar. The first housing portion may be placed in contact with the second housing portion such that the at least one bus bar contacts the circuitry and forms a direct electrical connection between the at least one bus bar and the circuitry. The first portion and second portions may be sealed together. In some aspects, the seal is a hermetic seal. The seal may be formed by plastic welding techniques.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations are merely examples and are not intended to be limiting. Throughout the drawings, similar symbols typically identify similar components, unless context dictates otherwise.

DETAILED DESCRIPTION OF THE PREFERRED EMBODIMENT

The following description is directed to certain implementations for the purpose of describing the innovative aspects of this disclosure. However, a person having ordinary skill in the art will readily recognize that the teachings herein can be applied in a multitude of different ways. In some implementations, the word "battery" or "batteries" will be used to describe certain elements of the embodiments described herein. It is noted that "battery" does not necessarily refer to only a single battery cell. Rather, any element described as a "battery" or illustrated in the Figures as a single battery in a circuit may equally be made up of any larger number of individual battery cells and/or other elements without departing from the spirit or scope of the disclosed systems and methods.

Reference may be made throughout the specification to "12 volt" power systems or sources. It will be readily apparent to a person having ordinary skill in the art that the phrase "12 volt" in the context of automotive electrical systems is an approximate value referring to nominal 12 volt power systems. The actual voltage of a "12 volt" system in a vehicle may fluctuate as low as roughly 4-5 volts and as high as 16-17 volts depending on engine conditions and power usage by various vehicle systems. Such a power system may also be referred to as a "low voltage" system. Some vehicles may use two or more 12 volt batteries to provide higher voltages. Thus, it will be clear that the systems and methods described herein may be utilized with battery arrangements in at least the range of 4-34 volts without departing from the spirit or scope of the systems and methods disclosed herein.

Figure 2:
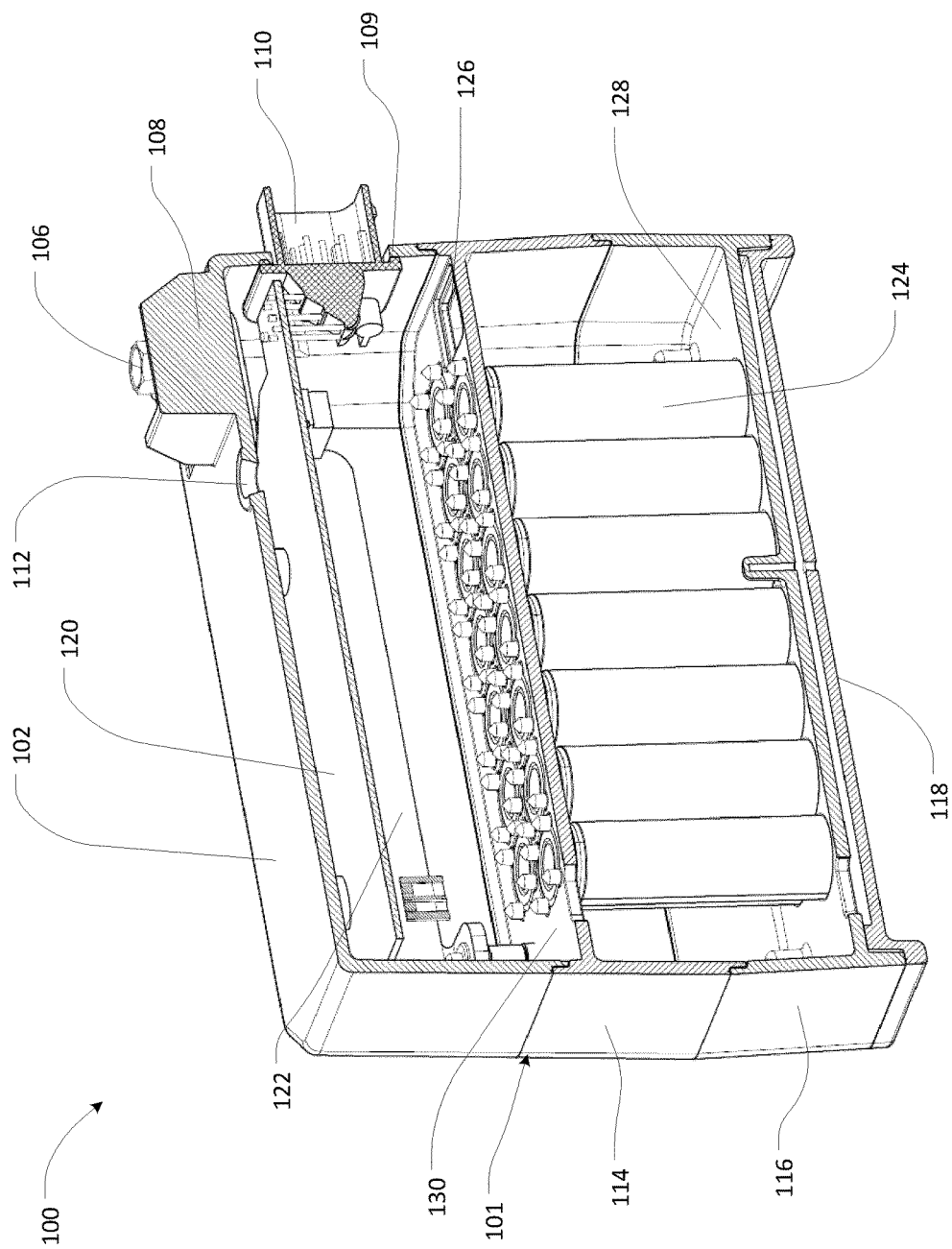
FIG. 2 is a cross sectional view of an assembled battery of FIG. 1.

To assist in the description of various components of the battery systems, the following coordinate terms are used (see, e.g., FIGS. 2-5). A "longitudinal axis" is generally parallel to the longest dimension of the battery housing embodiments depicted. A "lateral axis" is normal to the longitudinal axis. A "transverse axis" extends normal to both the longitudinal and lateral axes. For example, the cross sectional view of FIG. 2 depicts a plurality of cylindrical cells; each cell is oriented parallel to the transverse axis, while the cells are oriented in a row of seven cells along a line parallel to the longitudinal axis.

In addition, as used herein, "the longitudinal direction" refers to a direction substantially parallel to the longitudinal axis, "the lateral direction" refers to a direction substantially parallel to the lateral axis, and the "transverse direction" refers to a direction substantially parallel to the transverse axis.

The terms "upper," "lower," "top," "bottom," "underside," "top side," "above," "below," and the like, which also are used to describe the present battery systems, are used in reference to the illustrated orientation of the embodiment. For example, as shown in FIG. 2, the term "top side" may be used to describe the surface of the battery housing containing the positive and negative terminal posts, while the term "bottom" may be used to describe the location of the baseplate.

Traditional gasoline powered cars typically include a low voltage SLI (starting, lighting, ignition) battery. Similarly, electric vehicles may include a low voltage SLI battery along with a high voltage battery system having significant energy storage capacity and suitable for powering electric traction motors. The low voltage battery may be necessary to provide the startup power, power an ignition, close a high voltage battery contactor, and/or power other low voltage systems (e.g. lighting systems, electronic windows and/or doors, trunk release systems, car alarm systems, and the like).

In addition to powering the vehicle's propulsion motors, the high voltage batteries' output may be stepped down using one or more DC-to-DC converters to power some or all of the other vehicle systems, such as interior and exterior lights, power assisted braking, power steering, infotainment, automobile diagnostic systems, power windows, door handles, and various other electronic functions when the high voltage batteries are engaged.

High voltage batteries may be connected to or isolated from other vehicle circuitry by one or more magnetic contactors. Normally open contactors require a power supply in order to enter or remain in the closed circuit position. Such contactors may be configured to be in the open (disconnected) configuration when powered off to allow the high voltage batteries to remain disconnected while the vehicle is powered off. Thus, on startup, a small power input is required to close at least one contactor of the high voltage battery pack. Once a contactor is closed, the high voltage batteries may supply the power required to keep the contactor(s) closed and/or supply power to other vehicle systems.

Particular embodiments of the subject matter described by this disclosure can be implemented to realize one or more the following potential advantages. Rather than using a traditional lead-acid automobile battery, the present allows for a smart rechargeable battery that does not require a fluid filled container. In some aspects, one or more individual cells in a housing may be monitored individually or in subsets. In some aspects, additional individual cells may be provided within the housing such that the connected cells can provide more voltage than necessary to compensate for the potential of the loss of one or more of the cells. The disclosed design may be easier and/or less expensive to manufacture. For example, the number of manufacturing steps may be minimized and the labor may be simplified and/or made more efficient. For example, two halves of a battery housing may be assembled separately and electrical components may later be coupled together in one final step when the two housing halves are combined. Such a construction may minimize the number of sealing steps while sensitive parts are contained within the housing. A desiccant may be provided to remove excess moisture in the housing in order to further protect the electric components and/or cells within the housing. A valve may help prevent unsafe pressures from building up within the housing. In some aspects, the housing may be designed such that the parts inside the housing are inhibited from moving excessively and/or vibrating excessively while a vehicle is operated.

These, as well as, other various aspects, components, steps, features, objects benefits, and advantages will now be described with reference to specific forms or embodiments selected for the purposes of illustration. It will be appreciated that the spirit and scope of the cassettes disclosed herein is not limited to the selected forms. Moreover, it is to be noted that the figures provided herein are not drawn to any particular proportion or scale, and that many variations can be made to the illustrated embodiments.

Figure 1:
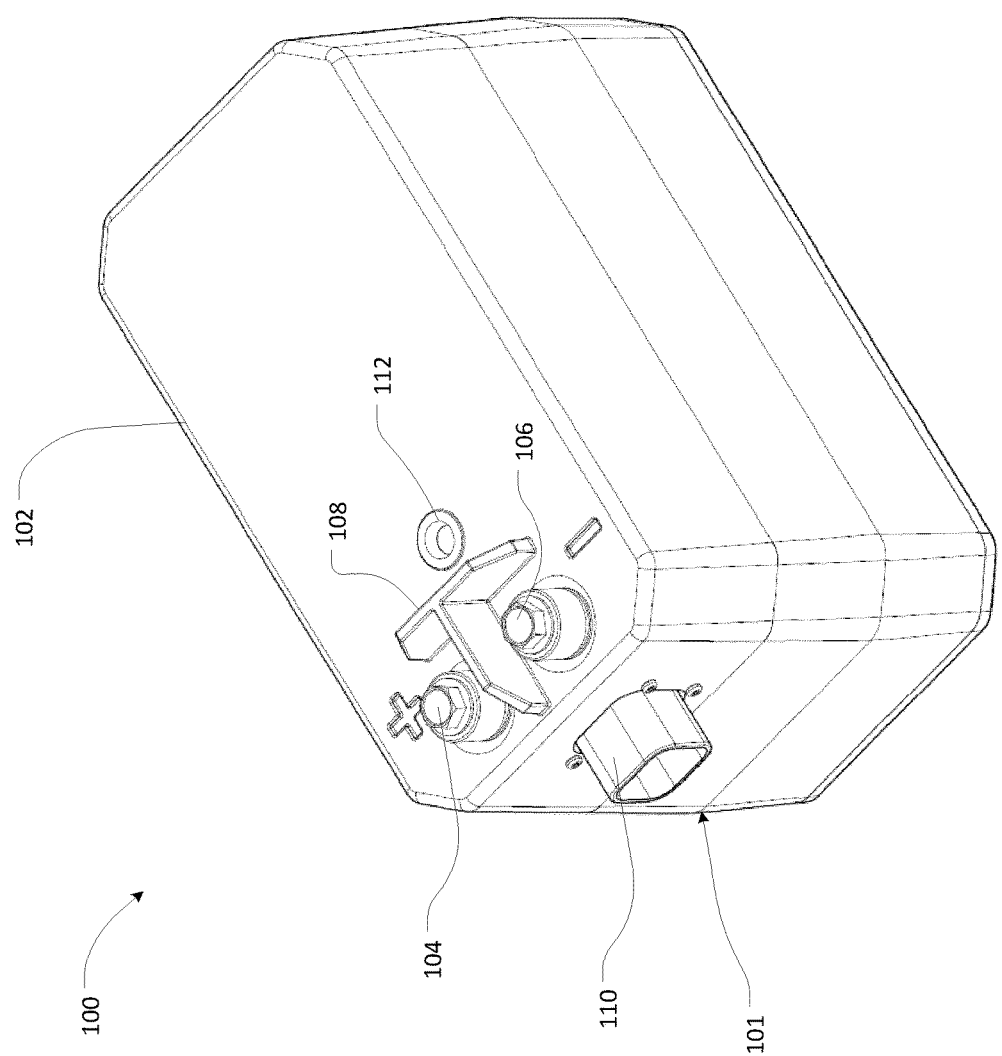
FIG. 1 is a top perspective view of an assembled low voltage automotive battery in accordance with an exemplary embodiment.

FIG. 1 is a top perspective view of an assembled battery 100 in accordance with an exemplary embodiment. The exterior of the lid 102 of the battery housing 101 includes a positive terminal post 104, a negative terminal post 106, a terminal post protection structure 108, a CAN connector 110, and a pressure vent 112. The positive terminal post 104 and negative terminal post 106 are connected to the interior components via internal bus bars and circuitry as described with reference to FIGS. 1 and 2.

The terminal post protection structure 108 may be formed as a single piece with the housing lid, for example, by molding or 3D printing. The protection structure 108 may be provided in order to protect the terminal posts 104 and 106 from unintentional or harmful contact. In addition, the protection structure 108 can prevent inadvertent creation of a short circuit between the terminal posts 104 and 106. For example, if a vehicle owner or mechanic drops a metal tool across the terminal posts 104 and 106 while performing maintenance, a short circuit is created. If the owner or mechanic attempts to retrieve the tool while it is in contact with both posts 104 and 106, severe electric shock may result. Thus, the terminal post protection structure 108 should include a longitudinal portion raised in the transverse direction far enough that a straight metal tool cannot touch both terminal posts 104 and 106 at the same time.

The valve 112 may be a waterproof pressure relief valve, such as a GORE protective vent. A waterproof pressure relief valve 112 may allow the pressure within the battery housing to equalize with the outside air pressure while preventing the low-humidity atmosphere within the battery 100 from being compromised. The valve 310 is described in greater detail with reference to FIG. 2.

FIG. 2 depicts a cross sectional view of an assembled battery 100 in accordance with an exemplary embodiment. The unitary battery housing 101 comprises a lid 102 and a lower portion including an upper housing body 114, a lower housing body 116, and a baseplate 118. The lid 102 includes the pressure vent 112, negative terminal post 106, terminal post protection structure 108, and an opening 109 for the CAN connector 110, as shown in the exterior view of FIG. 1.

Within the housing 101, the CAN connector 110 may be in electrical communication with a monitoring and control PCB 120. The terminal post 106 may be in electrical contact with a bus bar 122. Other circuitry (not shown) in electrical contact with the bus bar 122 may be further connected electrically to a plurality of electrochemical cells 124. A desiccant holder 126 may also be located within the housing 101.

The cross sectional view of FIG. 2 illustrates several advantages of the battery 100 over conventional designs. The unitary housing 101 provides a sealed environment for all internal components of the battery 100. In many existing automotive battery designs, the battery components are held in place by an internal structure, with an additional external protective structure, or blast shield, required to protect the battery 100 and maintain the desired interior conditions. Instead, the present battery housing 101 may contain integrated interior structural components to eliminate the need for additional interior components. For example, the lower housing body 116 described above may include an integrated lower cell holder framework 128, comprising an array of cylindrical openings sized to secure one end of each of the electrochemical cells 124. Similarly, the upper housing body 114 described above may include an integrated upper cell holder framework 130, comprising an array of cylindrical openings sized and arranged identically to the openings of the lower cell holder framework 128, so as to secure the opposite end of each of the electrochemical cells 124. Thus, the cells 124 may be held in place within the housing 101. In some embodiments, the portion of the lower space surrounding the cells 124 may be filled with an electronics potting compound to further secure the cells 124 in place and/or to reduce the effects of vibrations or other mechanical stresses on the battery 100. The potting compound may be any suitable gelatinous or solid compound, such as a silicone or other rubber gel, thermal setting plastics, epoxy, or the like.

The battery housing 101 will preferably be sealed or substantially sealed at all joints and ports so as to provide a stable environment for the electrochemical cells 124. Pressure and humidity variations may have significant detrimental effects on the battery 100. More specifically, the interior of the battery 100 should be kept at substantially the same pressure as the ambient air pressure to avoid excessive wear to the battery housing, seals, or other components. The interior of the housing 101 should also be kept relatively dry, as condensation or excess humidity may shorten battery life. Thus, a combination of environmental features may be provided to optimize moisture and pressure conditions within the battery 100.

Environmental control features may include a waterproof pressure relief valve 112, such as a GORE protective vent, and/or a desiccant contained within the desiccant holder 126. The waterproof pressure relief valve 112 may allow the pressure within the battery housing 101 to equalize with the outside air pressure while preventing liquids from entering the battery 100. Although some moisture may enter the battery 100 as air passes through the waterproof valve 112, the moisture may be removed within the battery 100 by a desiccant in the desiccant holder 126.

The desiccant within the battery housing 101 can be configured to absorb any moisture initially inside the housing 101 after manufacture, and may later absorb moisture from the air entering the battery housing 101 through the waterproof pressure valve 126 or a crack or hole in the material of the housing 101. In some embodiments, the upper cell holder framework 130 may also serve as a support for the desiccant holder 126. The desiccant holder 126 may be located near the cells 124 within the battery housing 101 so as to most effectively dry the air around the cells 124. However, the desiccant holder may be effective if located in any location within the battery housing 101.

The desiccant within the desiccant holder 126 may include a variety of desiccating or hygroscopic materials, such as silica gel, calcium sulfate, calcium chloride, activated charcoal, zeolites, Drierite, or any other suitable desiccant.

Figure 3:
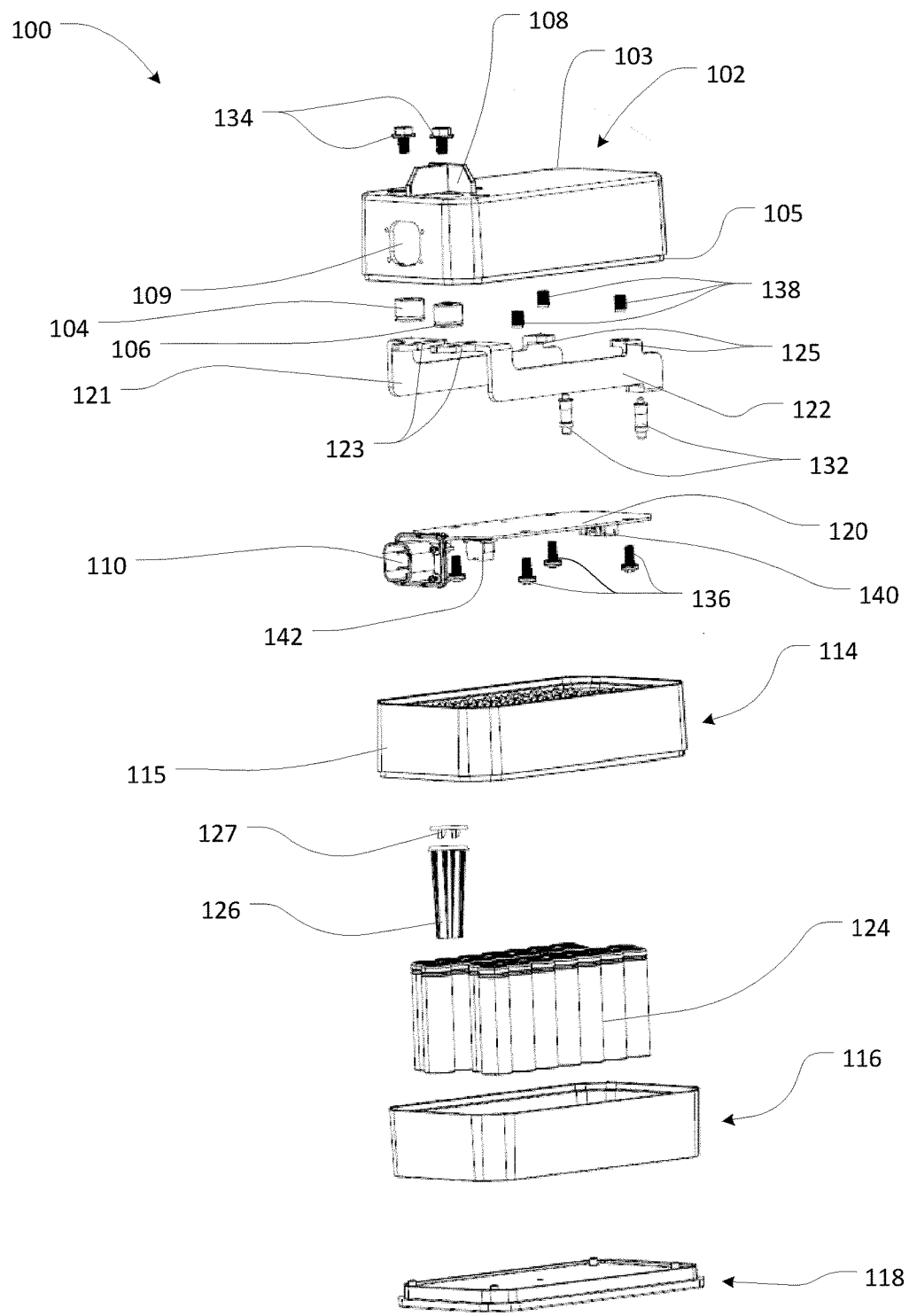
FIG. 3 is an exploded view of an automobile battery of FIG. 1.

FIG. 3 depicts an exploded view of the automotive battery 100 expanded along the transverse axis. As shown, the battery 100 includes a plurality of electrochemical cells 124 contained within a housing comprising a housing lid 102, an upper housing body 114, a lower housing body 116, and a housing baseplate 118, which can be joined, sealed, or welded to form a unitary battery housing. The upper housing body 114 has an upper edge 115. The lid 102 has an upper surface 103 and a lower edge 105. During manufacturing, the upper edge 115 of the upper housing body may be sealingly fitted into, around, or against the lower edge 105 of the lid 102. Such a seal may be formed, for example, using an appropriate sealant, adhesive, weld, vibratory weld, and the like. In this way, a first portion of the housing may be sealed to a second portion of the housing. The lid 102 includes terminal post protection structure 108 on its upper surface 103.

The housing may further contain a desiccant holder 126. A desiccant holder cover 127 may help contain the desiccant within the desiccant holder 126. Such a cap 127 may removably coupled to the desiccant holder 126 via a snap-fit, screw-fit, or other similar configuration.

Continuing with FIG. 3, a positive bus bar 121 and a negative bus bar 122 are disposed within the upper housing body 114 and/or the lid 102, and in electrical contact with the electrochemical cells 124 via connecting pins 132 and other circuitry (not shown). Terminal posts 104 and 106 extend through the housing lid 102 to the exterior of the battery 100 and are in electrical communication with the positive bus bar 121 and the negative bus bar 122. The terminal posts 104 and 106 are secured by terminal post fasteners 134. The bus bars 121 and 122 may be held to the lid 102 by flanges 123 and 125 and secured with fasteners 136 and inserts 138. Monitoring and control printed circuit board (PCB) 120 is disposed within an upper portion of the housing and may be configured to monitor the actual voltage across each cell 124 or a set of cells 124, or to monitor the current flowing into or out of the battery 100 through bus bars 121 and 122. The PCB may include elements such as a terminal power header 140 and a thermistor connector 142. The PCB 120 may be in electrical communication with the CAN connector 110 which extends through the housing lid 102 at opening 109 to the exterior of the battery 100. The PCB 120 may be supported in place by the CAN connector 110 as well as by the lid 102 and/or bus bars 121 and 122, and may be secured to the lid 102 and/or bus bars 121 and 122 by fasteners 136.

The electrochemical cells 124 are configured to provide direct current power. In some embodiments, the cells 124 may provide sufficient voltage to power low voltage systems of an electronic vehicle. In some aspects, the cells 124 may provide sufficient voltage to power a nominal 12-volt automotive power system.

The cells 124 may be any variety of electrochemical cell, such as lithium ion, nickel metal hydride, lead acid, or the like. In some embodiments with multiple electrochemical cells 124, the cells 124 may be arranged in any combination of parallel and series connections. For example, a battery delivering a maximum of 15.6 volts may include a single string of four 3.9-volt cells connected in series, multiple 4-cell serial strings connected in parallel, or four serially connected strings of multiple parallel cells, so as to provide a greater energy storage capacity at the same voltage of 15.6 volts.

The housing components 102, 114, 116, and 118 may be assembled at various times during manufacturing to form one housing structure. In some embodiments, housing components 102, 114, 116, and 118 may be glued or otherwise adhered together to form a single housing unit. In embodiments where the housing components are made of a plastic, the housing components may be joined by any suitable variety of plastic welding, such as hot gas welding, hot plate welding, contact welding, speed tip welding, laser welding, solvent welding, or the like, to form a robust protective housing. In some embodiments, the housing may be an integrated unit containing internal structure such as compartments for the electrochemical cells 124, so as to avoid the additional weight and complexity associated with having separate internal structural components. In some aspects, housing components 114, 116, and 118 and the other components housed therein may be assembled separately from housing component 102 and the components housed therein. These two portions may then be combined and sealed in a final manufacturing step.

Figure 4:
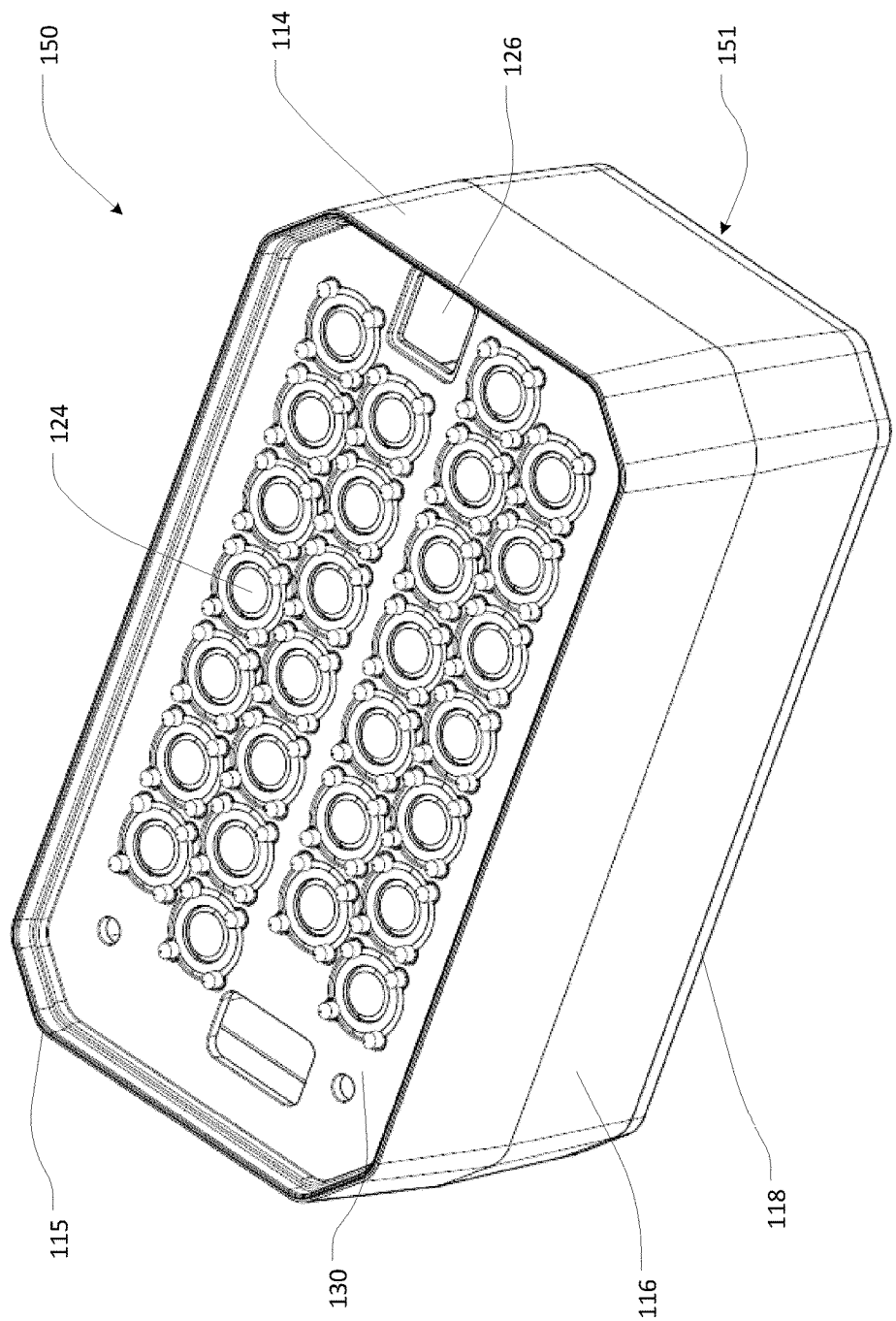
FIG. 4 is a perspective view of the lower portion of the battery of FIG. 1 as prepared for final assembly in accordance with an exemplary embodiment.
Figure 5:
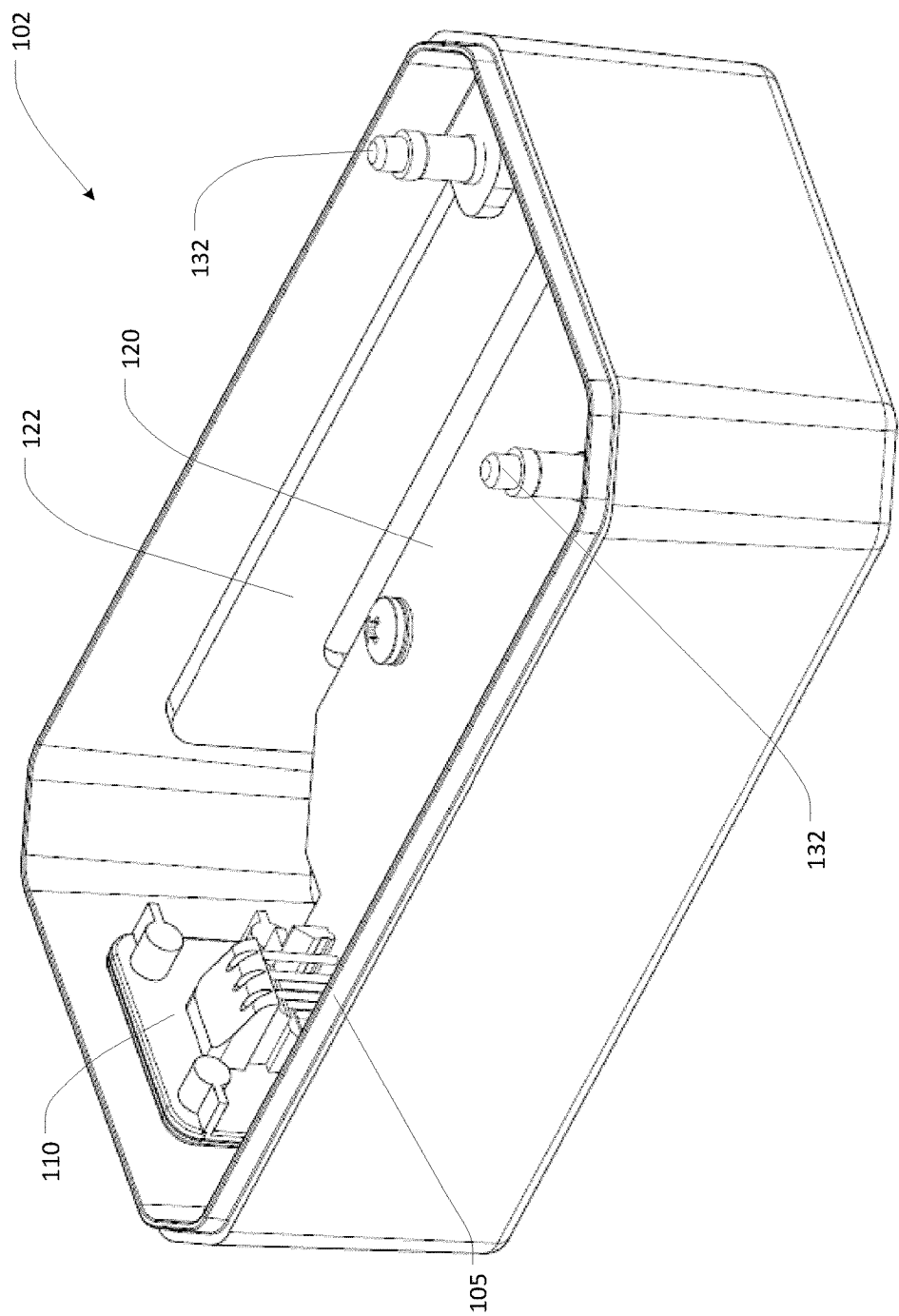
FIG. 5 is a perspective view of the upper portion of the battery of FIG. 1 prepared for final assembly in accordance with an exemplary embodiment. When assembled, the top portion may be inverted from its position shown in FIG. 5 and placed on top of the lower portion shown in FIG. 4 to form an assembled housing as shown in FIG. 3.

With reference to FIGS. 4 and 5, a simplified battery assembly process will now be described. In some aspects, the simplicity and efficiency of the battery assembly process are a result of various battery features described elsewhere herein. FIG. 4 depicts a lower portion 150 of a battery before final assembly. FIG. 5 depicts a lid 102 of a battery before final assembly, in an inverted orientation. A lower portion housing 151 may include the housing components 114, 116, and 118 described above, and may be manufactured with an upper interior framework 130 and lower interior framework 128 (not shown) for holding a plurality of electrochemical cells 124 and a desiccant holder 126, as described above with reference to FIGS. 2 and 3.

The lid 102 may be prepared for assembly by securing a negative bus bar 122 and a positive bus bar 121 (not shown) within the lid 102 with positive and negative terminal posts 104 (not shown) and 106 (not shown) connected to the bus bars 121 (not shown) and 122, and extending through the housing lid 102. Each bus bar has a connecting pin 132 configured to connect with circuitry of the lower portion 150 of the battery during assembly. A PCB 120 for battery monitoring and control may then be secured to the housing lid 102 and/or bus bars 121 (not shown) and 122 with a CAN connector 110 connecting to the PCB 120 through the housing lid 102.

With a completed battery lid 102 and lower battery portion 150, final assembly of the battery is straightforward and suitable for completion on an assembly line or similar high-capacity production line. The plurality of electrochemical cells 124 may be inserted into the cylindrical openings in the interior framework 130 of the lower portion housing 151, and a desiccant holder 124 containing desiccant may be inserted into the appropriate opening. A plurality of protrusions extending from the interior framework 130 may be melted to help secure the electrochemical cells 124 in place.

Circuitry (not shown) configured to connect the cells 124 to the bus bars 121 and 122 may be placed on top of the cells 124. In a final assembly step, the lid 102 may be turned upright, placed atop the lower portion 150 and pressed downward to couple the lower edge 105 of the housing lid to the upper edge 115 of the lower portion housing 151. At the same time, bus bar connecting pins 132 may form a press-fit connection to circuitry (not shown) of the lower portion 150, completing the electrical connection between the terminal posts and the electrochemical cells 124 via the bus bars 121 and 122, connecting pins 132, and other circuitry. The housing lid 102 and lower portion of the housing 151 may then be sealed at their intersection by any suitable form of plastic welding to complete the assembly.

Figure 6:
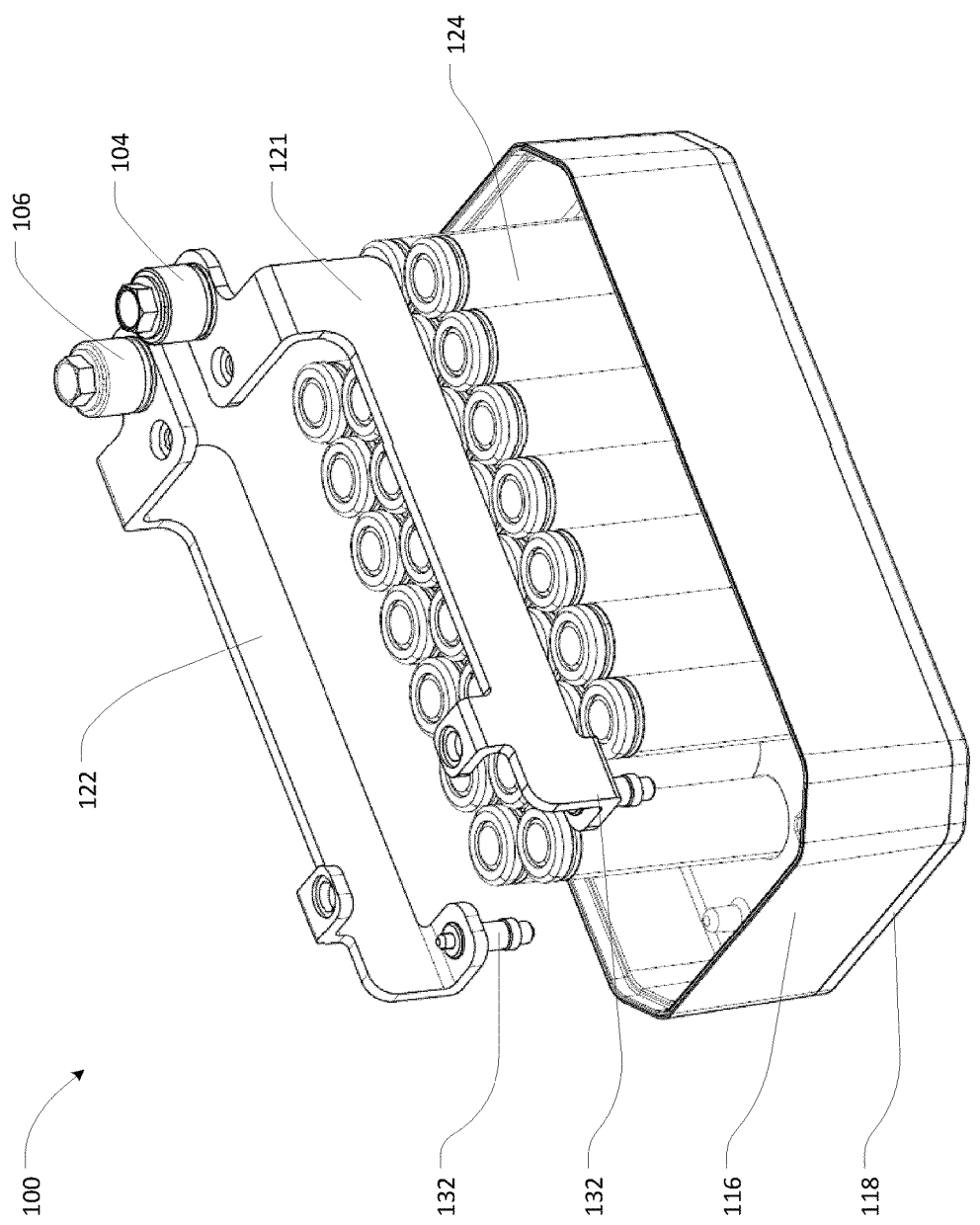
FIG. 6 is a partial cutaway perspective view of the battery of FIG. 1 illustrating the primary electrical connections of the battery in accordance with an exemplary embodiment.

FIG. 6 depicts a cutaway view of a battery 100 showing only the primary electrical connections of the battery 100 after final assembly. As used herein, the term "primary electrical connections" of the battery 100 refers to the conductive path between the electrochemical cells 124 and the terminal posts 104 and 106, by which the electrochemical cells 124 provide, for example, nominal 12 volt electrical power to various vehicle systems. Thus, the primary electrical connections may not include other conductive connections to the battery circuit such as control or monitoring systems. The primary electrical connections may include the electrochemical cells 124, connecting pins 132, bus bars 121 and 122, terminal posts 104 and 106, and other circuitry (not shown) connecting the cells 124 to the connecting pins 132. For clarity, the baseplate 118 and lower housing body 116 are also depicted. Thus, current can flow between the negative terminal post 106 and the negative terminal of the cells 124 by traveling through the negative bus bar 122, connecting pin 132, and other circuitry (not shown). Similarly, current can flow between the positive terminal of the cells 124 and the positive terminal post 104 by traveling through the other circuitry (not shown), connecting pin 132, and positive bus bar 121.

Figure 7A:
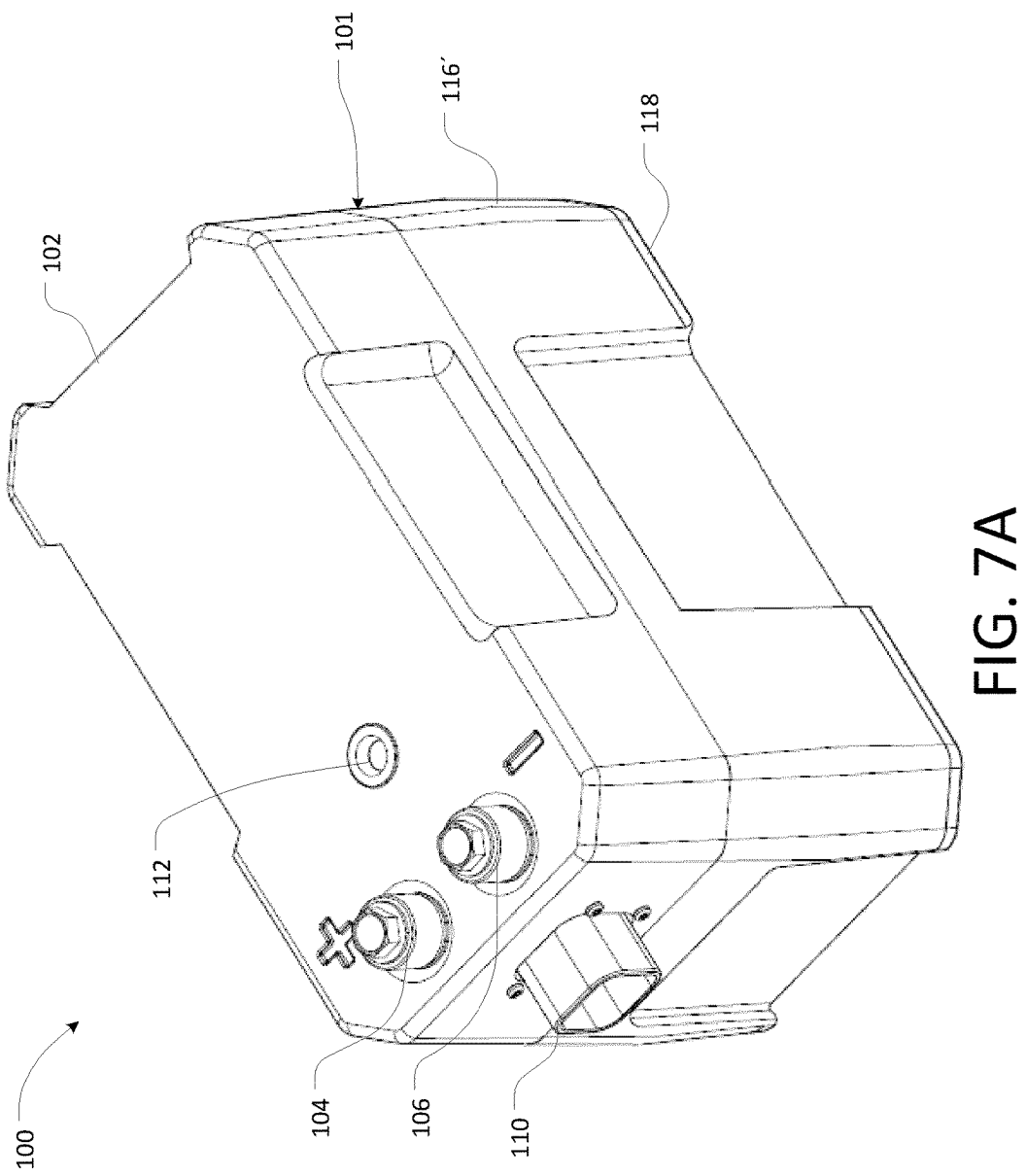
FIG. 7A is a top perspective view of an assembled low voltage automotive battery in accordance with an exemplary embodiment that is similar to the embodiment of FIG. 1.
Figure 7B:
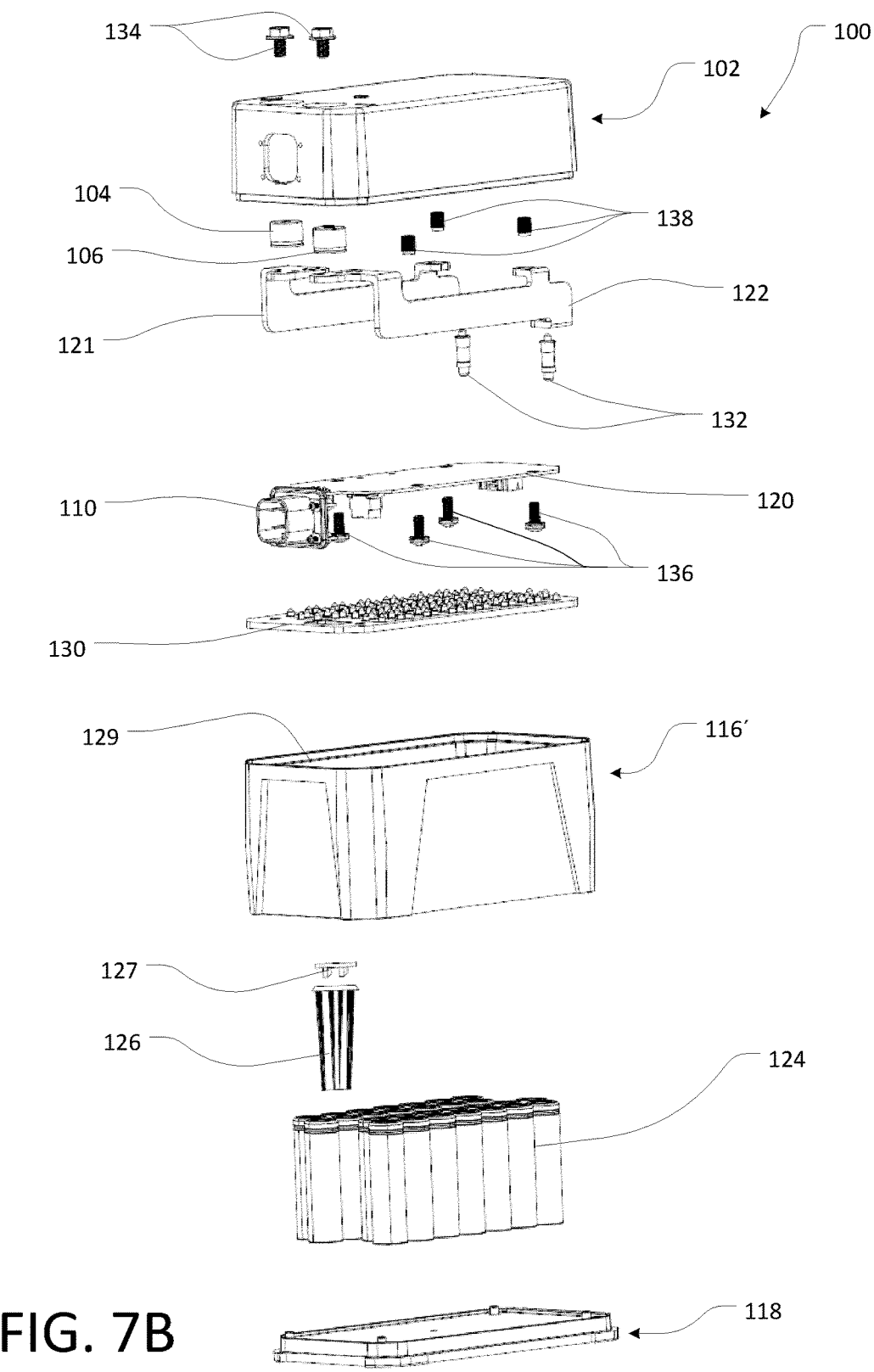
FIG. 7B is an exploded view of the automobile battery of FIG. 7A.

FIGS. 7A and 7B depict a vehicle battery 100 in accordance with an exemplary embodiment. FIG. 7A depicts the battery 100 in an assembled state. The battery 100 comprises many of the features described above with reference to the embodiments depicted in FIGS. 1-6. For example, the exterior of battery 100 may include a positive terminal post 104 and a negative terminal post 106, a pressure relieve valve 112, a CAN connector 110, and a housing 101 including a lid 102 and a baseplate 118. In some implementations, the housing body 116' may comprise a single piece, rather than an upper and lower portion. In other aspects, the housing 101 is formed from a plurality of individually pieces that are sealed together. A housing 101 with a single-piece housing body 116' requires only two plastic welding joints (i.e., one weld between the baseplate 118 and the housing body 116', and one weld between the housing body 116' and the lid 102), thus simplifying construction and increasing durability. Additional material may be used to reinforce the corners and/or upperside of the housing body 116' as shown in FIG. 8. Such a construction may increase rigidity and/or durability.

FIG. 7B depicts an exploded view of the battery 100 of FIG. 7A. As described elsewhere herein, the battery 100 includes a lid 102, bus bars 121 and 122 attached to the lid 102 by fasteners 136 and inserts 138, a PCB 120, terminal posts 104 and 106 with fasteners 134, connecting pins 132, electrochemical cells 124, an upper cell holder framework 130, battery connection circuitry (not shown), a housing body 116' including a lower cell holder framework 128 (not shown), a desiccant holder 126 with lid 127, and a baseplate 118. In some implementations with a single-piece housing body 116', one of the cell lock trays 128, 130, such as the upper cell lock tray 130, may be a separate piece held in place by a shelf 129 of the housing body and/or attached by an interior plastic weld. One or more plastic welds may also be used to help secure the cells 124 in place. The upper cell lock tray 130 may also help the cells stay in contact with the battery connection circuitry during vibrations experienced by, for example, driving an electric vehicle. The upper cell lock tray 130 may also improve rigidity and/or durability of the battery 100.

The lower portion of the battery 100 depicted in FIG. 7B may be assembled as follows. The baseplate 118 may be welded or otherwise joined to the housing body 116'. In other aspects, the baseplate 118 and body 116' are formed as a single unitary piece. The electrochemical cells 124 may then be inserted in a transverse direction into the holes in the integrated lower cell holder framework 128. The upper cell holder framework 130 may be placed on the shelf 129 of the housing body 116', where it may be secured by plastic welding or other securing means, thus securing the upper portion of the electrochemical cells 124 in place. Battery connection circuitry (not shown) may be placed on top of the upper cell holder framework 130 to complete the assembly of the lower portion of the battery 100. The lid 102 of the battery may be assembled as described above with reference to FIGS. 4 and 5, and the upper and lower portions of the battery may be joined to complete assembly.

The foregoing description details certain embodiments of the systems, devices, and methods disclosed herein. It will be appreciated, however, that no matter how detailed the foregoing appears in text, the devices and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated. The scope of the disclosure should therefore be construed in accordance with the appended claims and any equivalents thereof.

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

It is noted that the examples may be described as a process. Although the operations may be described as a sequential process, many of the operations can be performed in parallel, or concurrently, and the process can be repeated. In addition, the order of the operations may be rearranged. A process is terminated when its operations are completed. A process may correspond to a method, a function, a procedure, a subroutine, a subprogram, etc.

The previous description of the disclosed implementations is provided to enable any person skilled in the art to make or use the present disclosed process and system. Various modifications to these implementations will be readily apparent to those skilled in the art, and the generic principles defined herein may be applied to other implementations without departing from the spirit or scope of the disclosed process and system. Thus, the present disclosed process and system is not intended to be limited to the implementations shown herein but is to be accorded the widest scope consistent with the principles and novel features disclosed herein.

What is claimed is:

1. A method of assembling a vehicle battery from at least two housing portions, the method comprising:
   placing a plurality of rechargeable electrochemical cells into a first housing portion;
   electrically connecting the cells with circuitry configured to transfer electric current to, from, and between the plurality of rechargeable electrochemical cells;
   securing at least one bus bar to a second housing portion that is different from the first housing portion, the at least one bus bar connected to at least one terminal extending through the second housing portion;
   securing at least one printed circuit board to the at least one bus bar;
   contacting the first and second housing portions such that the at least one bus bar contacts the circuitry and forms a direct electrical connection between the at least one bus bar and the circuitry; and
   sealing the first portion to the second portion.

2. The method of claim 1, wherein the electrochemical cells have a top side and a bottom side, the top side having at least one positive terminal and at least one negative terminal disposed thereon.

3. The method of claim 2, wherein the step of electrically connecting the cells comprises placing the circuitry against the top side of the plurality of rechargeable electrochemical cells.

4. The method of claim 1, wherein the first housing portion and the second housing portion comprise plastic.

5. The method of claim 4, wherein the step of sealing the first portion to the second portion comprises plastic welding.

* * * * *